United States Patent [19]

Dorman

[11] 4,164,285
[45] Aug. 14, 1979

[54] THERMOMETER SHEATH

[75] Inventor: Henry P. Dorman, Arlington, Tex.

[73] Assignee: Arbrook, Inc., Arlington, Tex.

[21] Appl. No.: 900,209

[22] Filed: Apr. 26, 1978

[51] Int. Cl.$^2$ ............................................. G01K 1/08
[52] U.S. Cl. ................................................. 206/306
[58] Field of Search ........................ 73/339 R, 343 R;
128/2 H; 206/306, 305, 459; 116/114 AJ, 121

[56] References Cited

U.S. PATENT DOCUMENTS

| | | | |
|---|---|---|---|
| 3,221,871 | 12/1965 | Hidding | 206/306 |
| 3,295,675 | 1/1967 | Burns | 206/306 |
| 3,416,651 | 12/1968 | Jarand | 206/306 |
| 3,552,558 | 1/1971 | Ponoy | 206/306 |
| 3,752,309 | 8/1973 | Hopkins | 206/306 |
| 3,759,370 | 9/1973 | Blatz | 206/306 |
| 3,872,728 | 3/1975 | Joyce | 73/362 AR |

FOREIGN PATENT DOCUMENTS 603211 9/1934 Fed. Rep. of Germany ........... 206/440

Primary Examiner—S. Clement Swisher

[57] ABSTRACT

A thermometer probe sheath comprises a paper backing sheet, a first plastic sheet releasably supported on the backing sheet and a second plastic sheet overlying the first plastic sheet and sealed around its edges to the edges of the first plastic sheet except for an insertion opening at one end of the sheets. The edges of the plastic sheets at the insertion opening are coterminous with each other and with one edge of the backing sheet and notches are formed in only the coterminous edges of the backing sheet and the first plastic sheet. The coterminous edge of the second plastic sheet remains unnotched and thereby provides a stop against which a probe may be placed to expand the insertion opening. The second plastic sheet may be colored to provide a color contrast between it and the first plastic sheet to further facilitate the insertion of a probe.

3 Claims, 4 Drawing Figures

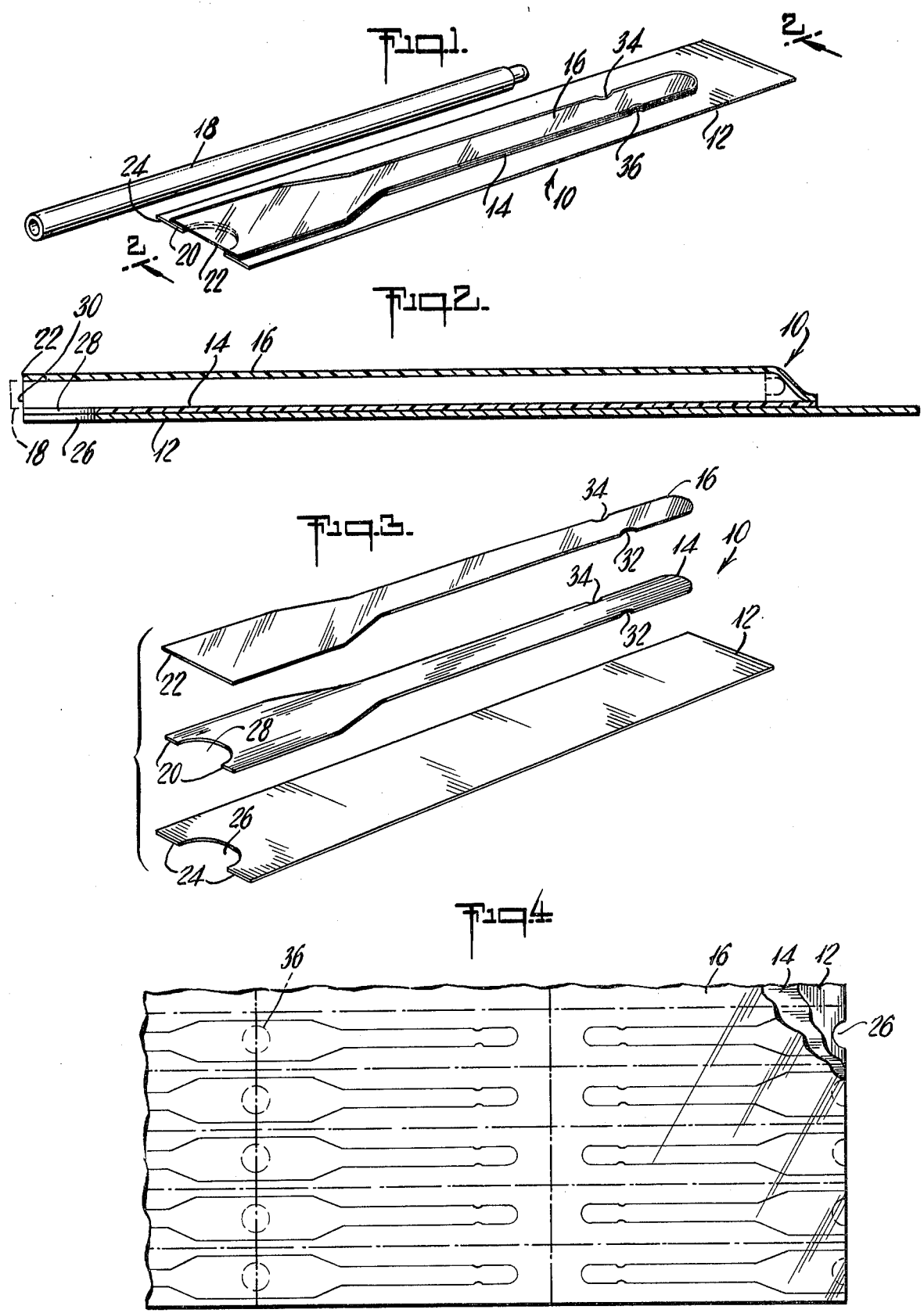

THERMOMETER SHEATH

BACKGROUND OF THE INVENTION

This invention relates to disposable thermometer probe sheaths or covers and, more particularly, to a unique probe cover structure that greatly facilitates the insertion of the probe into the cover.

In recent years, it has become very desirable to provide a means for covering a glass thermometer or the probe of an electronic thermometer to prevent cross contamination of patients during the use of the thermometers. Various rubber and plastic cover configurations have been proposed for this use and many of such proposals are primarily concerned with the ease with which the thermometer or probe may be inserted into the cover or with the procedure utilized in the removal of the thermometer or probe from the cover.

Many covers have been designed from relatively rigid metallic or plastic materials and others have been designed from more elastomeric materials, such as, latex rubber and flexible plastics. In addition, it has been proposed that probe covers may be provided which are secured to backing materials which support the probe covers during handling but which may be removed from the probe covers during use. Again, the primary concern of those who have proposed various thermometer and probe cover constructions has been to provide a structure that will facilitate the insertion of the probe into an entrance opening in the cover. This problem is addressed and solutions are presented in the following U.S. Pat. Nos. 3,221,871; 3,416,651; 3,759,370; and 3,872,728.

It will be apparent from reviewing the proposed structures set forth in the above-cited patents that heretofore there has been a continuing problem with respect to the development of a probe cover structure that facilitates the insertion of the probe into the cover and that is easy to handle both prior to and after use.

SUMMARY OF THE INVENTION

The present invention provides a thermometer sheath or cover that is particularly simple in construction and yet greatly facilitates the insertion of the thermometer into the sheath and provides a virtually foolproof configuration for locating the insertion opening.

The sheath assembly comprises a three-component structure which has a paper backing sheet, a first plastic sheet releasably supported on the backing sheet and a second plastic sheet sealed around its periphery to the periphery of the first plastic sheet, except for an insertion opening which appears at one end of the composite structure. The two edges of the plastic sheets that form the insertion opening are coterminous with each other and with one edge of the paper backing sheet. Formed in the edge of the paper backing sheet and the first plastic sheet which is in contact with the backing sheet are coextensive notches which permit the thermometer probe to be placed directly in contact with the unnotched edge of the second plastic sheet. This permits the thermometer probe to be forced against the edge of the second plastic sheet to thereby expand the insertion opening and properly locate the thermometer probe therein. The fact that the edges of all three of the sheets are coterminous provides support to the relatively flexible plastic sheets and permits the desired expansion of the insertion opening.

In another aspect of the invention, the second plastic sheet may be colored to provide a color contrast between it and the first plastic sheet, which is preferably clear in color. This color contrast further facilitates the location of the insertion opening and permits the operator to properly position the thermometer probe relative to the opening.

BRIEF DESCRIPTION OF THE DRAWING

Other objects and advantages of the invention will appear from the description of the preferred embodiment in connection with the following drawing in which:

FIG. 1 is a perspective view of the unique thermometer probe sheath of the present invention;

FIG. 2 is a cross sectional view taken along line 2—2 in FIG. 1;

FIG. 3 is a perspective assembly view showing the three individual components of the thermometer probe sheaths of the present invention; and FIG. 4 is a plan view with portions broken away for clarity of a plurality of thermometer probe sheaths in a single band prior to disattachment for individual use.

DESCRIPTION OF A PREFERRED EMBODIMENT

A three-component thermometer probe sheath 10 is illustrated in FIGS. 1 through 3 and is made from a paper backing sheet 12, a first plastic sheet 14 and a second plastic sheet 16. Assembly 10 may be manufactured in a conventional heat sealing operation which may involve the manipulative steps of superimposing sheets 12, 14, and 16 and sealing the sheets together by applying heat from a heat sealing die having a contour conforming to the outer periphery of sheets 14 and 16. As in conventional heat sealing operations, excess plastic material that is located outside the periphery of sheets 14 and 16 may be discarded following the heat sealing operation. In order to provide an opening into which thermometer probe 18 may be inserted, edges 20 and 22 of sheets 14 and 16, respectively, are not sealed together.

Referring to FIG. 1, it will be seen that edges 20 and 22 are coterminous with each other and with edge 24 of backing sheet 12 on at least the outer portions of the edges. A notch 26 and a coextensive notch 28 are formed in edges 24 and 20, respectively, to provide an access for thermometer probe 18 into the insertion opening 30 formed between sheets 14 and 16.

After probe 18 has been placed into position against the unnotched edge 22 of sheet 16, the edge and top portion of sheet 16 may be expanded by the force of the probe to permit the tip of the probe to be easily inserted and fully positioned between the relatively slippery surfaces of sheets 14 and 16 (see FIG. 2). Following the complete insertion of probe 18 into the sheath, it is only necessary to move probe 18 in a direction away from backing sheet 12 in order to release the underside of sheet 14 from the backing sheet. The thermometer probe is thereafter in a condition to be placed in a body cavity of a patient in order to take the temperature of the patient.

As an additional aid to the operator in the location of insertion opening 30, it has been found to be very desirable to provide a color contrast between sheet 16 and sheets 12 and 14. For example, in the preferred embodiment, sheet 16, which has the unnotched edge 22, is formed from a green plastic film, and sheet 14 is formed from a clear plastic film. Backing sheet 12 may be a white, or other neutral shade, paper in order to provide the desired color contrast.

After the probe has been utilized for its intended purpose, the probe sheath may be removed therefrom and discarded into an appropriate receptacle. Referring to FIGS. 1 and 3, it will be noted that the closed end of the sheath is provided with a pair of indentations 32 and 34 which provide a decreased internal diameter within the sheath at this location. Because it is desirable to invert the probe sheath during the removal procedure, indentations 32 and 34 tend to fit tightly about the outside diameter of the thermometer probe and thereby resist removal of the sheath from the probe. Therefore, when the insertion opening 30 is grasped by an operator and pulled toward the tip of probe 18, indentations 32 and 34 will resist removal from the probe and assist in the inversion of the sheath with respect to probe 18. This will insure a more sanitary handling of the probe sheath and avoid the spread of bacteria that may result if the operator is required to handle the sheath in an uninverted condition.

Probe sheath 10 may be made as a single unit or a plurality of units may be simultaneously fabricated as illustrated in FIG. 4. A continuous backing sheet 12 may have plastic sheets 14 and 16 combined therewith and the entire three-component assembly may be passed through a conventional heat seal and trimming apparatus (not shown). Notches 26 and 28 may be formed during this automatic operation and their configuration may be semi-circular as shown at 26 in FIG. 4 or the notches for two adjacent sheaths may be formed in the configuration of a circle as illustrated at 36. Following the formation of a plurality of probe sheaths as illustrated in FIG. 4, the sheaths may be dispensed in sheet form and then removed individually as they are used or they may be divided into individual probe sheets for later dispensing.

Although the materials usable with the unique probe sheath of the present invention are not critical, the plastic material used in the construction of sheets 14 and 16 may preferably be a relatively thin, flexible, slippery plastic. Polyethylene film has been found to be very suitable for this purpose. The paper backing material may be any suitable paper, such as, the paper currently utilized in the production of heat sealed gloves and the like.

It will be apparent from the foregoing description that the present invention provides a uniquely configured thermometer probe sheath that is both simple to fabricate and yet provides a probe insertion structure that greatly facilitates the insertion of the thermometer probe. To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A thermometer probe sheath assembly, comprising: a paper backing sheet; a first plastic sheet releasably secured to said backing sheet; a second plastic sheet overlying said first plastic sheet and sealed around its periphery to the periphery of said first plastic sheet, except for an insertion opening at one end of said sheets, the edges of said plastic sheets at said one end being coterminous with each other and with one edge of said backing sheet; and said coterminous edges of said backing sheet and said first plastic sheet having notches formed therein to facilitate the insertion of a probe into said sheath.

2. The thermometer probe sheath of claim 1, wherein the coterminous edge of said second plastic sheet is unnotched and acts as a stop against which a probe may be placed to expand said insertion opening.

3. The thermometer probe sheath of claim 1, wherein said first plastic sheet is a clear film and said second plastic sheet is a colored film to provide a color contrast for facilitating the insertion of a probe.

* * * * *